(12) United States Patent
Marchi et al.

(10) Patent No.: US 12,736,328 B2
(45) Date of Patent: Sep. 15, 2026

(54) INSPECTION SYSTEM FOR SHELL CASINGS

(71) Applicant: General Inspection, LLC, Davisburg, MI (US)

(72) Inventors: Nadaly Marchi, Holly, MI (US); Nathan Kujacznski, Swartz Creek, MI (US); Miguel Millan, Clarkston, MI (US)

(73) Assignee: General Inspection, LLC, Davisburg, MI (US)

( * ) Notice: Subject to any disclaimer, the term of this patent is extended or adjusted under 35 U.S.C. 154(b) by 71 days.

(21) Appl. No.: 18/625,921

(22) Filed: Apr. 3, 2024

(65) Prior Publication Data

US 2025/0314477 A1 Oct. 9, 2025

(51) Int. Cl.
*G01B 11/10* (2006.01)
*F42B 35/00* (2006.01)
*F42B 35/02* (2006.01)

(52) U.S. Cl.
CPC ............ *G01B 11/105* (2013.01); *F42B 35/00* (2013.01); *F42B 35/02* (2013.01)

(58) Field of Classification Search
CPC ......... G01B 11/105; F42B 35/02; F42B 35/00
See application file for complete search history.

(56) References Cited

U.S. PATENT DOCUMENTS 6,285,034 B1 * 9/2001 Hanna .................. G01B 11/245 250/559.24
6,959,108 B1 * 10/2005 Bartelt ................. G01N 21/952 850/10
7,403,872 B1 * 7/2008 St. Onge ............... B07C 5/3422
8,004,694 B2 * 8/2011 Lee .................... G01B 11/2433 356/228
8,723,068 B2 * 5/2014 Nygaard ................... B07C 5/10 209/586
9,575,013 B2 * 2/2017 Nygaard .............. G01N 21/909
10,094,785 B2 * 10/2018 Offenborn .......... G01B 11/2425
11,334,741 B2 * 5/2022 Lodewyckx ............ G06T 7/596
2005/0174567 A1 * 8/2005 Hanna .................... G01N 21/55 356/237.1
2013/0062262 A1 * 3/2013 Nygaard ............ G01B 11/2433 209/552
2014/0168661 A1 * 6/2014 Nygaard ................ G01B 11/24 356/601

FOREIGN PATENT DOCUMENTS

WO WO-2005022076 A2 * 3/2005 ......... G01B 11/2425

* cited by examiner

*Primary Examiner* — Michael P LaPage
(74) *Attorney, Agent, or Firm* — Brooks Kushman P.C.

(57) ABSTRACT

An inspection system includes a conveyance system, at least one laser, at least one camera, and a controller. The conveyance system is configured to transport casings. Each casing has an exterior surface and a recessed region extending inward from the exterior surface. Each recessed region has a depth and a diameter. The at least one laser is configured to project first and second laser lines onto the recessed region of each casing along the corresponding diameter of each casing. The at least one camera is configured to capture a set of images of the first and second laser lines on the recessed region of each casing. The controller is programmed to estimate a magnitude of each diameter of each recessed region based on a corresponding set of images of the first and second laser lines on a corresponding recessed region of each casing.

20 Claims, 6 Drawing Sheets

INSPECTION SYSTEM FOR SHELL CASINGS

TECHNICAL FIELD

The present disclosure relates to inspection systems for manufactured products or components.

BACKGROUND

Inspection systems may be utilized to detect defects in manufactured products during production of such manufactured products.

SUMMARY

An inspection system for shell casings includes a conveyance system, a first laser, a second laser, a first camera, a second camera, a third camera, a fourth camera, and a controller. The conveyance system is configured to transport the shell casings such that primer pockets defined along ends of the shell casings are exposed. The first and second lasers are disposed on first and second opposing sides of the conveyance system, respectively. The first and second lasers are oriented at first and second angles relative to axes of the primer pockets, respectively. The first and second lasers are configured to project first and second laser lines onto interior surfaces of the shell casings within the primer pockets. The first and second cameras are disposed on the first and second opposing sides of the conveyance system, respectively. The first and second cameras are oriented at third and fourth angles relative to the axes of the primer pockets, respectively. The first and second cameras are configured to capture a first set of images of the first and second laser lines on the interior surfaces of the shell casings within the primer pockets. The third and fourth cameras are disposed on the first and second opposing sides of the conveyance system, respectively. The third and fourth cameras are oriented at fifth and sixth angles relative to the axes of the primer pockets, respectively. The third and fourth cameras are configured to capture a second set of images of the first and second laser lines on the interior surfaces of the shell casings within the primer pockets. The controller is programmed to calculate diameters of the primer pockets based on the first and second sets of images of the first and second laser lines. The controller is further programmed to, in response to the diameters of the primer pockets being within a tolerable range, direct the shell casings in a first direction along the conveyance system. The controller is further programmed to, in response to the diameters of the primer pockets being outside of the tolerable range, direct the shell casings in a second direction along the conveyance system.

An inspection system for casings (each casing defining a pocket extending inward from an exterior surface) includes a first laser, a second laser, a first camera, a second camera, and a controller. The first and second lasers are disposed on first and second opposing sides of the casings, respectively, are oriented at first and second angles relative to longitudinal axes of the casings, respectively, and are configured to project first and second laser lines onto an interior surface of each casing within the corresponding pocket of each casing. The first and second cameras are disposed on the first and second opposing sides of the casings, respectively, are oriented at third and fourth angles relative to the longitudinal axes of the casings, respectively, and are configured to capture a set of images of the first and second laser lines on the interior surface of each casing. The controller is programmed to estimate a dimension of each pocket based on a corresponding set of images of the first and second laser lines on a corresponding interior surface of each casing.

An inspection system for casings (each casing having an exterior surface and a recessed region extending inward from the exterior surface, and each recessed region having a depth and a diameter) includes at least one laser, at least one camera, and a controller. The at least one laser is configured to project first and second laser lines onto the recessed region of each casing along the corresponding diameter of each casing. The at least one camera is configured to capture a set of images of the first and second laser lines on the recessed region of each casing. The controller is programmed to estimate a magnitude of each diameter of each recessed region based on a corresponding set of images of the first and second laser lines on a corresponding recessed region of each casing.

DETAILED DESCRIPTION

Figure 1:
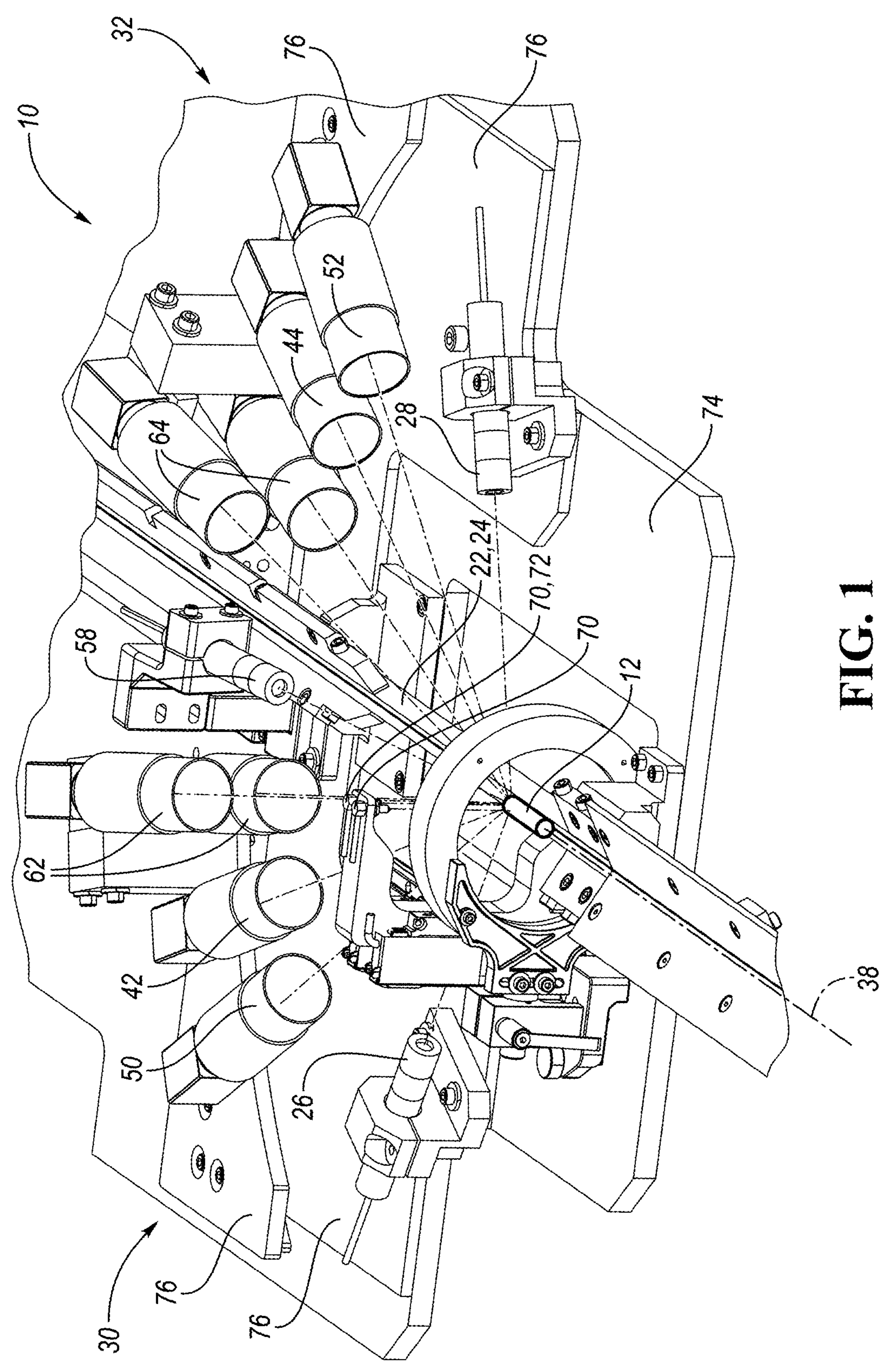
FIG. 1 is a front perspective view of an inspection system.
Figure 2:
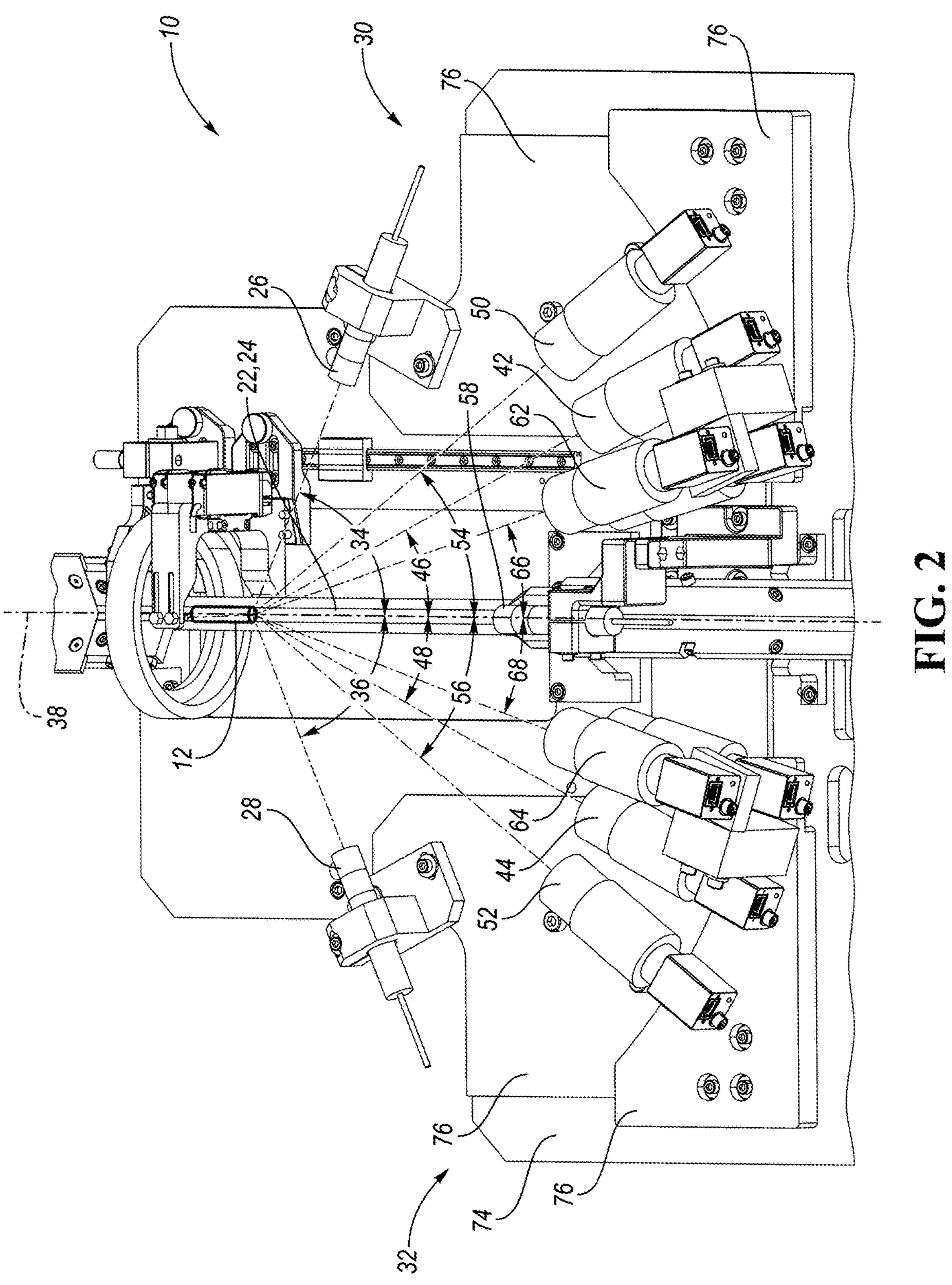
FIG. 2 is a top perspective view of the inspection system.
Figures 3, 4:
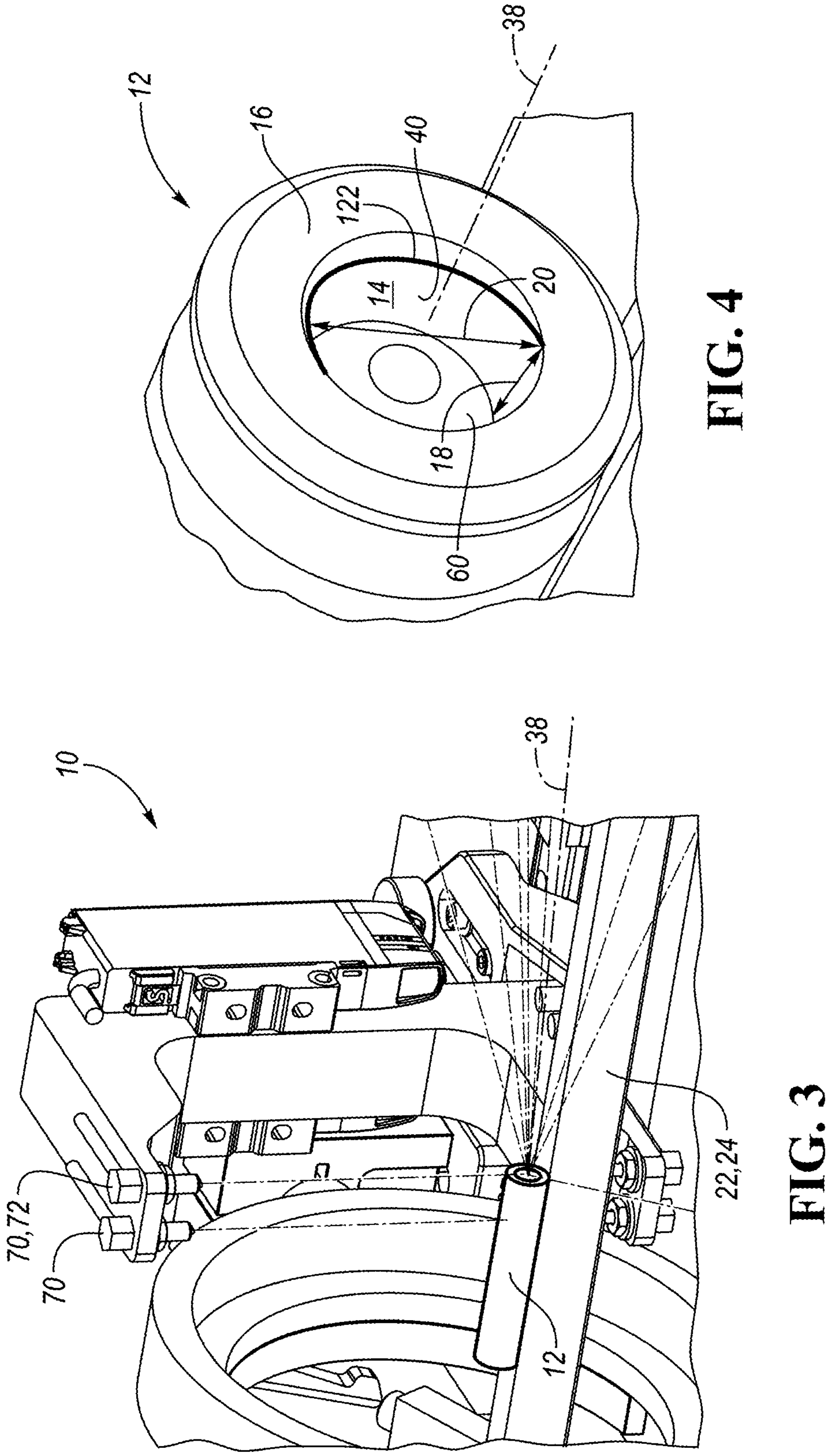
FIG. 3 is a side perspective view of a set of trigger sensors for the inspection system.
FIG. 4 is a bottom perspective view of an ammunition shell casing illustrating a primer pocket defined by the ammunition shell casing and a laser line being projected onto an interior surface of the ammunition shell casing within the primer pocket.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIGS. 1-4, an inspection station or inspection system 10 for manufactured components is illustrated. More specifically, the manufactured components may be ammunition cartridges or ammunition shell casings 12. More specifically, the shell casings 12 may define recessed regions or primer pockets 14 that extend inward from exterior surfaces 16 of the shell casings 12. The primer pockets 14 may extend inward from the exterior surfaces 16 along bottoms or lower ends of the shell casings 12. The primer pockets 14 may have a depth dimension 18 and a diameter dimension 20. The depth dimension 18 may be substantially perpendicular or orthogonal to the diameter dimension 20. As used herein, substantially perpendicular or orthogonal refers to any incremental angle that is between exactly perpendicular and 15° or less from exactly perpendicular (e.g., 12.5° or less from exactly perpendicular, 10° or less from exactly perpendicular, 5° or less from exactly perpendicular, 1° or less from exactly perpendicular, 0.5° or less from exactly perpendicular, etc.).

The inspection system 10 includes a conveyance system 22. The conveyance system 22 is configured to transport the shell casings 12 such that primer pockets 14 are exposed or are facing outward. The inspection system 10 includes at least one laser configured to project laser lines onto the primer pockets 14 of each shell casing 12 along the corresponding diameter 20 of each shell casing 12. The inspection system 10 also includes at least one camera configured to capture a set of images of the laser lines on the primer pockets 14 of each shell casing 12. The at least one camera may be single lens cameras, plenoptic cameras, stereo cameras, or any other type of camera.

The conveyance system 22 may include a gravity fed chute 24. The shell casings 12 may slide downward along the gravity fed chute 24 into the pathway of the at least one laser and the field-of-view of the at least one camera. More specifically, the shell casings 12 may slide downward along the gravity fed chute 24 so that the primer pockets 14 are positioned within the pathway of the at least one laser and the field-of-view of the at least one camera. The set of images of the laser lines on the primer pockets 14 of each shell casing 12 are then captured once the shell casings 12 are in the pathway of the at least one laser and the field-of-view of the at least one camera. The laser lines may be projected onto the shell casings 12 and the at least one camera may capture the set of images of the laser lines while the shell casings 12 are moving downward along the gravity fed chute. However, the images of the laser lines may be captured while the shell casings 12 are stationary. The conveyance system 22 may comprise alternative systems that transport the shell casings 12 into the pathway of the at least one laser and the field-of-view of the at least one camera. For example, a robot, a pick and place, a conveyor belt or chain, a walking beam, or any other conveyance system known in the art may be configured to transport the shell casings 12 into the pathway of the at least one laser and the field-of-view of the at least one camera.

The at least one laser may include a first laser generator 26 and a second laser generator 28 disposed on first and second opposing sides 30, 32 of the conveyance system 22, respectively. The first laser generator 26 may be referred to as the first laser while the second laser generator 28 may be referred to as the second laser. The first laser 26 and the second laser 28, or more specifically the center lines of the pathways of the first laser 26 and the second laser 28, are oriented at a first angle 34 and a second angle 36 relative to axes 38 of the primer pockets 14, respectively. Axes 38 may also correspond to longitudinal axes of the shell casings 12 as positioned on the conveyance system 22 and/or to a direction of flow of the shell casing 12 along the conveyance system 22. The first laser 26 and the second laser 28 are configured to project first and second laser lines, respectively, onto interior surfaces 40 of the shell casings 12 within the primer pockets 14 and along the diameter dimension 20 of the primer pockets 14. The first angle 34 may range between 60° and 70°. The first angle 34 extends between the axes 38 and the first side 30 of the conveyance system 22. The second angle 36 ranges between 60° and 70°. The second angle 36 extends between the axes 38 and the second side 32 of the conveyance system 22.

The at least one camera may include a first camera 42 and a second camera 44 disposed on the first and second opposing sides 30, 32 of the conveyance system 22, respectively. The first camera 42 and the second camera 44, or more specifically the center lines of the fields-of-view of the first camera 42 and the second camera 44, are oriented a third angle 46 and a fourth angle 48 relative to the axes 38, respectively. The first camera 42 and the second camera 44 are configured to capture a first set of images of the first and second laser lines on the interior surfaces 40 of the shell casings 12 within the primer pockets 14. The third angle 46 may range between 20° and 30°. The third angle 46 extends between the axes 38 and the first side 30 of the conveyance system 22. The fourth angle 48 ranges between 20° and 30°. The fourth angle 48 extends between the axes 38 and the second side 32 of the conveyance system 22.

The at least one camera may include a third camera 50 and a fourth camera 52 disposed on the first and second opposing sides 30, 32 of the conveyance system 22, respectively. The third camera 50 and the fourth camera 52, or more specifically the center lines of the fields-of-view of the third camera 50 and the fourth camera 52, are oriented a fifth angle 54 and a sixth angle 56 relative to the axes 38, respectively. The third camera 50 and the fourth camera 52 are configured to capture a second set of images of the first and second laser lines on the interior surfaces 40 of the shell casings 12 within the primer pockets 14. The fifth angle 54 may range between 30° and 40°. The fifth angle 54 extends between the axes 38 and the first side 30 of the conveyance system 22. The sixth angle 56 ranges between 30° and 40°. The sixth angle 56 extends between the axes 38 and the second side 32 of the conveyance system 22.

The at least one laser may include a third laser generator 58. The third laser generator 58 may be referred to as the third laser. The third laser 58 may be located at an elevated position above the conveyance system 22. The third laser 58 may be configured to project a laser light or spot onto an interior surface 60 of the shell casings 12 within the primer pockets 14 along the bottom of the shell casings 12.

The at least one camera may include a first stacked pair of cameras 62 and a second stacked pair of cameras 64 disposed on the first and second opposing sides 30, 32 of the conveyance system 22, respectively. The first stacked pair of cameras 62 and a second stacked pair of cameras 64, or more specifically the center lines of the fields-of-view of the first stacked pair of cameras 62 and a second stacked pair of cameras 64, are oriented at a seventh angle 66 and an eighth angle 68 relative to the axes 38, respectively. The first stacked pair of cameras 62 and the second stacked pair of cameras 64 are configured to capture a set of images of the laser light or spot as projected onto an interior surface 60 of the shell casings 12 along the bottom of the shell casings 12. The seventh angle 66 may range between 10° and 20°. The seventh angle 66 extends between the axes 38 and the first side 30 of the conveyance system 22. The eighth angle 68 ranges between 10° and 20°. The eighth angle 68 extends between the axes 38 and the second side 32 of the conveyance system 22.

The inspection system 10 may include one or more triggering sensors 70 that are configured to detect the shell casings 12 and trigger when the various laser generators (e.g., first laser 26, second laser 28, and third laser 58) are configured to emit laser light and/or when the cameras (e.g., first camera 42, second camera 44, third camera 50, fourth camera 52, first stacked pair of cameras 62, and second stacked pair of cameras 64) are configured to take pictures of laser light, laser spots, or laser lines as projected onto the shell casings 12. The trigger sensors 70 may include a pair of laser sensors. The laser generators are configured to emit laser light and/or the cameras are configured to take pictures of laser light, laser spots, or laser lines as projected onto the shell casings 12 once the end of the shell casings 12 have triggered both triggering sensors 70 and once the detection field-of-view of the second sensor 72 of the triggering sensors 70 reaches an end of the shell casings 12, which corresponds to positions where the primer pockets 14 are defined.

The cameras (e.g., first camera 42, second camera 44, third camera 50, a fourth camera 52, first stacked pair of cameras 62, and second stacked pair of cameras 64), laser generators (e.g., first laser 26, second laser 28, and third laser 58), conveyor components (e.g., gravity fed chute 24) and all other components may be secured to a base plate 74 and additional mounting plates 76 to properly position the various components relative to each other. The first camera 42, second camera 44, third camera 50, fourth camera 52, first laser 26, and second laser 28 are illustrated as having pathways or fields-of-view that are substantially coplanar with axes 38 as positioned on the conveyance system 22. At least one camera of the first stacked pair of cameras 62, at least one camera of the second stacked pair of cameras 64, and third laser 58 are illustrated as having pathways or fields-of-view elevated at an angle relative to the substantially coplanar relationship of the first camera 42, second camera 44, third camera 50, fourth camera 52, first laser 26, and second laser 28.

It should be understood, however, that the first camera 42, second camera 44, third camera 50, fourth camera 52, first laser 26, and second laser 28 may be elevated at an angle relative to the substantially coplanar relationship that includes the axes 38 and that the first stacked pair of cameras 62, second stacked pair of cameras 64, and third laser 58 may be in a substantially coplanar relationship with the axes 38. As used herein, substantially coplanar refers to any incremental angle that is between exactly planar and 5° or less from exactly planar (e.g., 2.5° or less from exactly planar, 1° or less from exactly planar, 0.5° or less from exactly planar, 0.25° or less from exactly planar, 0.1° or less from exactly planar, etc.).

Figures 5, 6:
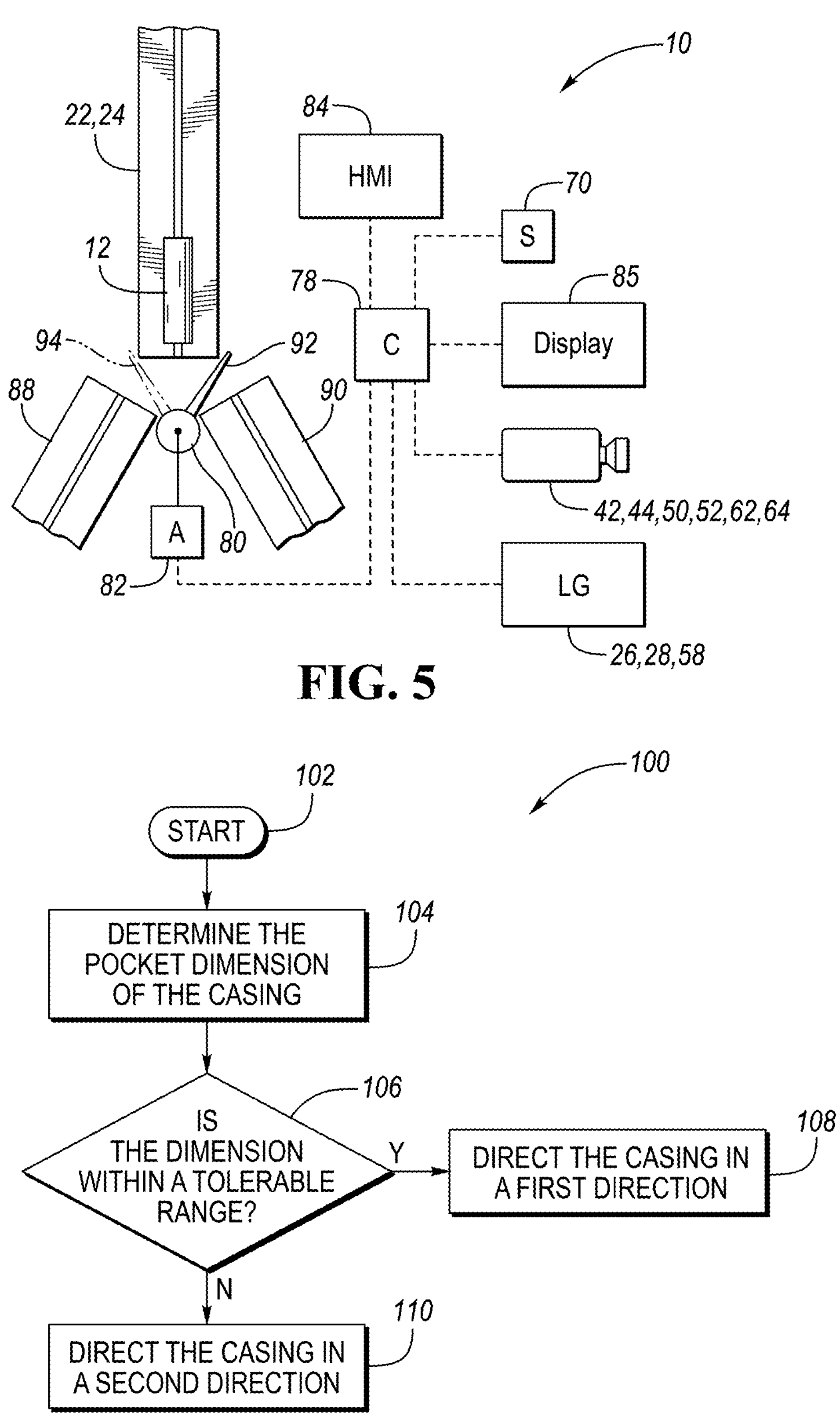
FIG. 5 is a diagrammatic view of the inspection system.
FIG. 6 is a flowchart illustrating a method for controlling the inspection system.

Referring to FIGS. 5, a diagrammatic view of the inspection system 10 is illustrated. The inspection system 10 is configured to inspect the shell casings 12. Inspection of the shell casings 12 may include calculating, determining, or estimating dimensions of the shell casings based on the images of the laser lights, laser spots, or laser lines as projected onto the shell casings 12. For example, the diameter dimension 20 of the primer pockets 14 may be calculated, determined, or estimated based on (i) the first set of images taken by the first and second cameras 42, 44 of the first and second laser lines as projected onto the interior surfaces 40 of the shell casings 12 within the primer pockets 14 by the first and second laser generators 26, 28 and (ii) the second set of images taken by the third and fourth cameras 50, 52 of the first and second laser lines as projected onto the interior surfaces 40 of the shell casings 12 within the primer pockets 14 by the first and second laser generators 26, 28. As another example, the depth dimension 18 of the primer pockets 14 may be calculated, determined, or estimated based on a set of images taken by the first and second stacked pairs of cameras 62, 64 of the laser light or spot as projected onto an interior surface 60 of the shell casings 12 by the third laser generator 58.

The inspection system 10 may include a controller 78. The controller 78 may be in communication with the cameras (e.g., first camera 42, second camera 44, third camera 50, fourth camera 52, first stacked pair of cameras 62, and second stacked pair of cameras 64), the laser generators (e.g., first laser 26, second laser 28, and third laser 58), the one or more triggering sensors 70, a sorting device 80 (or more specifically an actuator 82 for the sorting device 80), a human machine interface (HMI) 84, and a display screen 85 via an electrical or wireless system that communicates the state or condition of such components or information from such components via an electrical or wireless signal to the controller 78.

The controller 78, the cameras, the laser generators, the one or more triggering sensors 70, the sorting device 80 (or more specifically the actuator 82), the HMI 84, and the display screen 85, and any other component that is part of the inspection system 10 may be connected to a power source (e.g., a local power grid). Electrical wiring is not depicted in the Figures for simplicity purposes. The controller 78 may include control logic or an algorithm that is configured to calculate, determine, or estimate dimensions (e.g., the diameter dimensions 20 and the depth dimensions 18 of the primer pockets 14) of the shell casings 12 based on the images of the laser lights, laser spots, or laser lines as projected onto the shell casings 12. More specifically, the controller 78 may include control logic or an algorithm that analyzes images taken by the cameras, which are communicated to the controller 78, in order to calculate, determine, or estimate dimensions of the shell casings 12.

While illustrated as one controller, the controller 78 may be part of a larger control system and may be controlled by various other controllers throughout the inspection system 10. It should therefore be understood that the controller 78 and one or more other controllers can collectively be referred to as a "controller" that controls various actuators in response to signals from various sensors to control functions of the inspection system 10. The controller 78 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 78 in controlling the inspection system 10.

Control logic or functions performed by the controller 78 may be represented by flow charts or similar diagrams in one or more figures. These figures provide representative control strategies and/or logic that may be implemented using one or more processing strategies such as event-driven, interruptdriven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based controller, such as controller 78. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the inspection system 10. The computer-readable storage devices or media may include one or more of a number of known physical devices which utilize electric, magnetic, and/or optical storage to keep executable instructions and associated calibration information, operating variables, and the like.

Once inspected, the shell casing 12 may be sorted based on whether or not the calculated, determined, or estimated magnitudes of the dimensions (e.g., the diameter dimensions 20 and the depth dimensions 18 of the primer pockets 14) of the shell casings 12 are within tolerable ranges. The shell casings 12 may be directed toward either a first path or a second path along the conveyance system 22. Directing the shell casings toward the first path may correspond to directing the shell casings 12 in a first direction. Directing the shell casings toward the second path may correspond to directing the shell casings 12 in a second direction. The first path may be referred to as a "passing component or part path" where the calculated, determined, or estimated magnitudes of the dimensions of the shell casings 12 are within tolerable ranges. The second path may be referred to as a "failed or rejected component or part path" where at least one of the calculated, determined, or estimated magnitudes of the dimensions of the shell casings 12 are not within the tolerable ranges.

Directing the shell casings 12 toward the first path may include directing the shell casings 12 into a first outlet chute 88. The first outlet chute 88 may be referred to as a "passing component chute" that is configured to direct the shell casings 12 that have "passed" the inspection to a "passed components or parts bin or container" (not shown) or to an additional conveyance system (not shown). Directing the shell casings 12 toward the second path may include directing the shell casings 12 into a second outlet chute 90. The second outlet chute 90 may be referred to as a "failed or rejected component chute" that is configured to direct the rejected shell casings 12 that have "failed" the inspection to a "failed components bin or container" (not shown) or to an additional conveyance system (not shown). Although the outlet conveyances (i.e., the first outlet chute 88 and the second outlet chute 90) of the inspection system 10 are illustrated a gravity fed chutes, the outlet conveyances that are configured to direct the shell casing toward either the first path or second path may be a robot, a pick and place, a conveyor belt or chain, a walking beam, or any other conveyance system known in the art.

The sorting device 80 may comprise a flipper or other device that is configured to direct the inspected shell casings 12 toward one of at least two paths based on whether or not the shell casings 12 have "passed" inspection. For example, a robot or pick and place may operate to place the inspected shell casings 12 in one of several bins or on one of several downstream conveyors based on whether or not the shell casings 12 have "passed" inspection. As another example, one of several conveyors may be activated to direct the inspected shell casings 12 toward one of several bins or toward one of several downstream conveyors based on whether or not the shell casings 12 have "passed" inspection.

The sorting device 80 may be configured to transition between a first position 92 and a second position 94 to direct the shell casings 12 toward either the first path (e.g., the first outlet chute 88) or toward the second path (e.g., the second outlet chute 90). The actuator 82 may comprise, but is not limited to, a solenoid, a pneumatic cylinder, or a servo motor. The actuator 82 may be configured to transition the sorting device 80 between the first position 92 and the second position 94. The first outlet chute 88, the second outlet chute 90, and the sorting device 80 may collectively be referred to as an outlet conveyance system of the inspection system 10. The outlet conveyance system should not be construed as limited to the outlet conveyance system depicted. The outlet conveyance system may include any type of device or conveyance system (e.g., robots, pick and places, conveyor belts or chains, walking beams, etc.) known in the art that is capable of sorting manufactured components based on the results of an inspection of the manufactured components.

The controller 78 may be configured to operate actuator 82 in order to transition the sorting device 80 between the first position 92 and the second position 94 in order to direct the inspected shell casings 12 to either the first path or the second path. The control logic or algorithm may operate to deem the shell casings 12 as either "passing" or "failing" as the shell casings 12 are moving along the conveyance system 22 (e.g., as the shell casings 12 are sliding downward along the gravity fed chute 24). The control logic or algorithm may further operate to adjust the position of the sorting device 80 via the actuator 82, prior to the shell casings 12 reaching the sorting device 80 but after the shell casings 12 were deemed as either "passing" or "failing" components, in order to direct the shell casings 12 to the appropriate path based on whether the shell casings 12 were deemed as either "passing" or "failing."

The control logic or algorithm may be configured to time the adjustment of the position of the sorting device 80 after the shell casings 12 have been inspected by the cameras (e.g., first camera 42, second camera 44, third camera 50, fourth camera 52, first stacked pair of cameras 62, and second stacked pair of cameras 64 capturing the laser lights, laser spots, or laser lines as projected onto the shell casings 12) but before the shell casings 12 reach the sorting device 80 based on the velocity and/or acceleration of the shell casings 12 along the conveyance system 22.

The HMI 84 may include an interface that allows an operator or user to operate the inspection system 10. For example, the HMI 84 may include control buttons or a touch screen that allow an operator to initiate automated or manual operation of the inspection system 10. The HMI 84 may also include control buttons or a touch screen that allow an operator to power up or power down the inspection system 10.

The display unit or display screen 85 may be a subcomponent of the HMI 84 (e.g., a touchscreen) or may be a separate component from the HMI 84. The display screen 85 may be configured to display whether or not the inspection system 10 and/or the subcomponents of the inspection system 10 are in an "on" or "off" state; the current operating condition of the inspection system 10 and/or the subcomponents of the inspection system 10 (e.g., whether the inspection system 10 and/or the subcomponents of the inspection system 10 are operating in an automated or manual mode); whether or not there are any faults within the inspection system 10 and/or the subcomponents of the inspection system 10 (e.g., a shell casing 12 stuck or jammed along the gravity fed chute 24, one or more of the cameras are not communicating images to controller 78, the sorting device 80 is jammed, any of the other components are not communicating with the controller 78, etc.); whether or not a "passed parts" bin or a "failed or rejected parts" bin is full; etc.

Referring to FIG. 6, a flowchart of a method 100 for controlling the inspection of the shell casings 12 via the inspection system 10 is illustrated. The method 100 may be stored as control logic and/or algorithms within the controller 78. The controller 78 may implement the method 100 by controlling the various actuators or other subcomponents of the inspection system 10. The method 100 is initiated at start block 102. The method 100 may be initiated via a shell casing 12 entering the inspection system 10. The presence of the shell casing 12 may be detected by the triggering sensors 70. The triggering sensors 70 may then communicate the presence of the shell casings 12 to the controller 78.

Next, the method 100 moves on to block 104 where a dimension of the shell casing 12 is calculated, determined, or estimated based on the images of the laser lights, laser spots, or laser lines as projected onto the shell casings 12. More specifically, at block 104 a magnitude of the diameter dimension 20 of the primer pockets 14 may be calculated, determined, or estimated based on (i) the first set of images taken by the first and second cameras 42, 44 of the first and second laser lines as projected onto the interior surfaces 40 of the shell casings 12 within the primer pockets 14 by the first and second laser generators 26, 28 and (ii) the second set of images taken by the third and fourth cameras 50, 52 of the first and second laser lines as projected onto the interior surfaces 40 of the shell casings 12 within the primer pockets 14 by the first and second laser generators 26, 28.

Figure 7B:
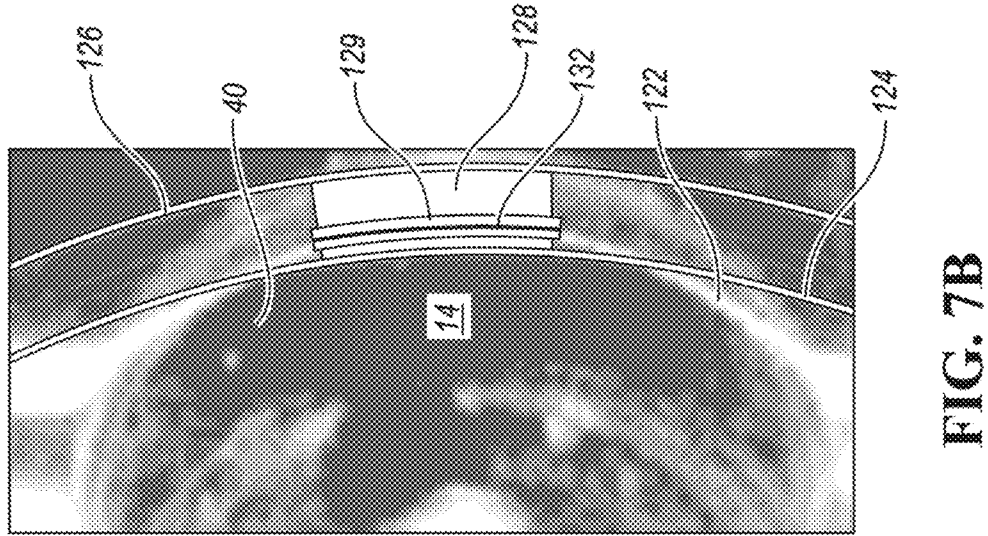
FIGS. 7A and 7B illustrate a first set of images of first and second laser lines being projected onto an interior surface of an ammunition shell casing within a primer pocket defined by the ammunition shell casing.
Figure 7A:
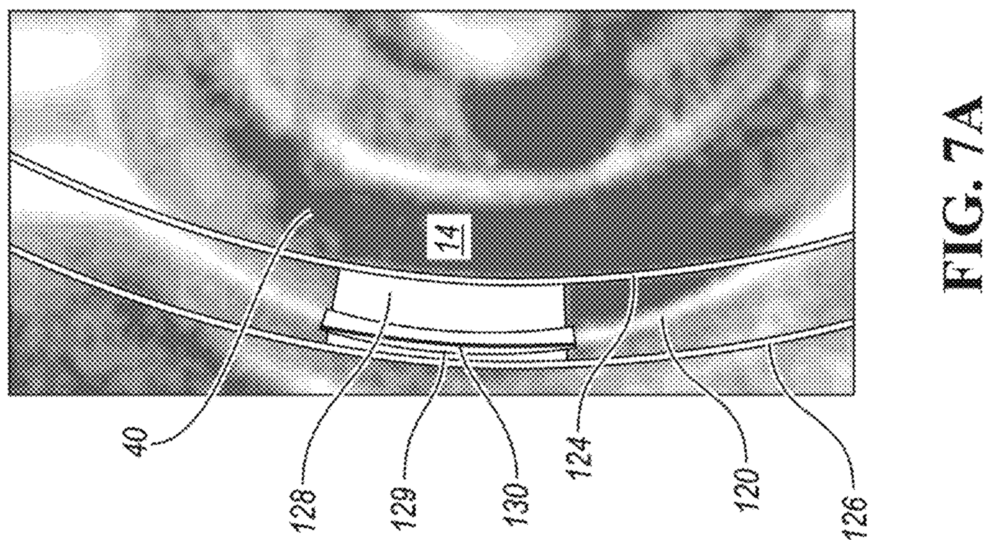

A curve fitting algorithm and/or a regression analysis, such as a least mean square analysis, is applied to the first set of images taken by the first and second cameras 42, 44 of the first and second laser lines as projected onto the interior surfaces 40 of the shell casings 12 within the primer pockets 14. An example of the first set of images taken by the first and second cameras 42, 44 of first and second laser lines 120, 122 as projected onto the interior surface 40 of one of the shell casings 12 within the primer pocket 14 is illustrated in FIGS. 7A and 7B. The curve fitting algorithm and/or regression analysis is limited to inner curved or circular boundaries 124, outer curved or circular boundaries 126, and predetermined windows 128 between the inner boundaries 124 and the outer boundaries 126.

The first and second laser lines 120, 122 are oriented at an angle relative to the interior surface 40 that defines the diameter 20 of the primer pocket 14 (e.g., the first and second laser lines 120, 122 are not perpendicular to the axes 38). Therefore, the areas of the predetermined windows 128 are limited to portions of the first and second laser lines 120, 122 that are only projected onto the interior surface 40 of the shell casing 12 and the predetermined windows 128 are positioned along centers of the field-of-views of the first and second cameras 42, 44 to minimize or eliminate distortion of the first and second laser lines 120, 122. The portion of the first and second laser lines 120, 122 within the windows 128 may be less than half of the portions of first and second laser lines 120, 122 that are projected onto the interior surface 40 of the shell casing 12. Curved line 130 is extrapolated from the first laser line 120 and curved line 132 is extrapolated from the second laser line 122 within the predetermined windows 128. Extrapolation of the curved lines 130, 132 may be further limited to subregions 129 within the windows 128 once the first and second laser lines 120, 122 are detected. Such subregions 129 may have inner curved or circular boundaries and outer curved or circular boundaries that are within the inner curved or circular boundaries 124 and the outer curved or circular boundaries 126. Subregions 129 include the regions where the first and second laser lines 120, 122 have been detected but exclude other regions within windows 128 where the first and second laser lines 120, 122 were not detected to eliminate noise and unnecessary data. The curve fitting algorithm and/or a regression analysis is applied to curved line 130 and curved line 132 to form a first circle that is a first estimate of the magnitude of the diameter dimension 20 of the primer pocket 14.

Figure 8B:
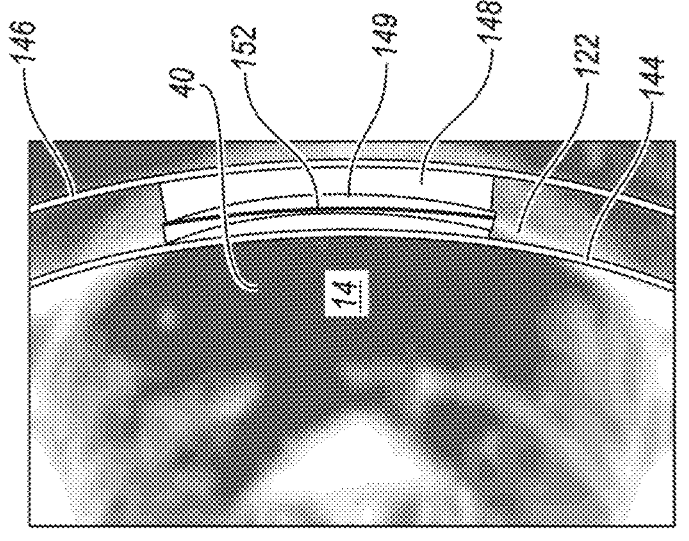
FIGS. 8A and 8B illustrate a second set of images of the first and second laser lines as being projected onto the interior surface of the ammunition shell casing within the respective primer pocket.
Figure 8A:
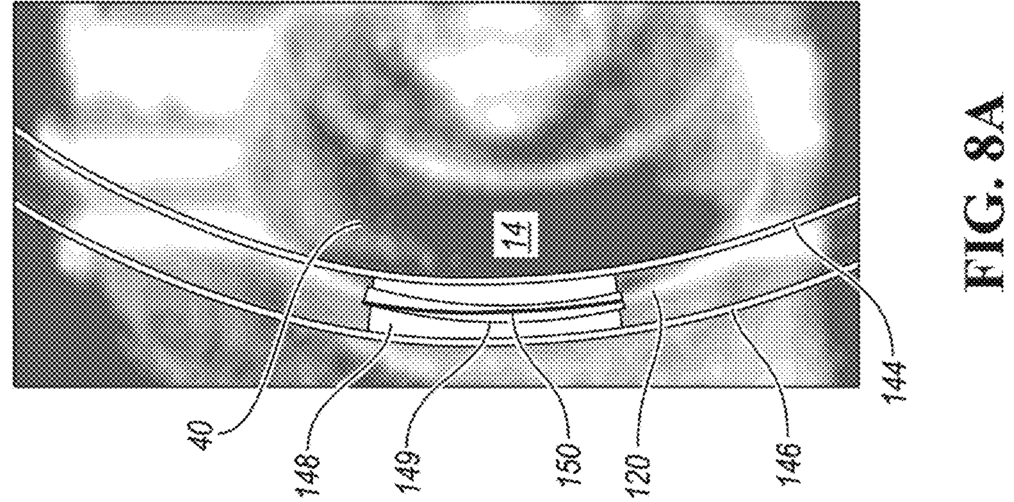

The curve fitting algorithm and/or regression analysis, such as a least mean square analysis, is also applied to the second set of images taken by the third and fourth cameras 50, 52 of the first and second laser lines as projected onto the interior surfaces 40 of the shell casings 12 within the primer pockets 14. An example of the second set of images taken by the third and fourth cameras 50, 52 of the first and second laser lines 120, 122 as projected onto the interior surface 40 of one of the shell casings 12 within the primer pocket 14 is illustrated in FIGS. 8A and 8B. The curve fitting algorithm and/or regression analysis is limited to inner curved or circular boundaries 144, outer curved or circular boundaries 146, and predetermined windows 148 between the inner boundaries 144 and the outer boundaries 146.

The first and second laser lines 120, 122 are oriented at an angle relative to the interior surface 40 that defines the diameter 20 of the primer pocket 14 (e.g., the first and second laser lines 120, 122 are not perpendicular to the axes 38). Therefore, the areas of the predetermined windows 148 are limited to portions of the first and second laser lines 120, 122 that are only projected onto the interior surface 40 of the shell casing 12 and the predetermined windows 148 are positioned along centers of the field-of-views of the third and fourth cameras 50, 52 to minimize or eliminate distortion of the first and second laser lines 120, 122. The portion of the first and second laser lines 120, 122 within the windows 148 may be greater than half of the portions of the first and second laser lines 120, 122 that are projected onto the interior surface 40 of the shell casing 12. Curved line 150 is extrapolated from the first laser line 120 and curved line 152 is extrapolated from the second laser line 122 within the predetermined windows 148. Extrapolation of the curved lines 150, 152 may be further limited to subregions 149 within the windows 148 once the first and second laser lines 120, 122 are detected. Such subregions 149 may have inner curved or circular boundaries and outer curved or circular boundaries that are within the inner curved or circular boundaries 144 and the outer curved or circular boundaries 146. Subregions 149 include the regions where the first and second laser lines 120, 122 have been detected but exclude other regions within windows 148 where the first and second laser lines 120, 122 were not detected to eliminate noise and unnecessary data. The curve fitting algorithm and/or a regression analysis is applied to curved line 150 and curved line 152 to form a second circle that is a second estimate of the magnitude of the diameter dimension 20 of the primer pocket 14.

The diameter dimension 20 of the primer pockets 14 of each shell casing 12 may be an average of (i) the first estimate of the magnitude of the diameter dimension 20 of the primer pocket 14 on the corresponding shell casing 12 (i.e., the magnitude based on the first circle which is extrapolated from curved line 130 and curved line 132) and (ii) the second estimate of the magnitude of the diameter dimension 20 of the primer pocket 14 on the corresponding shell casing 12 (i.e., the magnitude based on the second circle which is extrapolated from curved line 150 and curved line 152).

The method 100 next moves on to block 106 where it is determined if the dimension of the shell casing 12 (e.g., diameter dimension 20 of the primer pockets 14) as calculated, determined, or estimated at block 104 is within a tolerable range. If the dimension of the shell casing 12 is within the tolerable range, the method 100 moves on to block 108 where the shell casing 12 is directed in a first direction (e.g., toward the "passing component or part path" or first outlet chute 88). If the dimension of the shell casing 12 is not within the tolerable range, the method 100 moves on to block 110 where the shell casing 12 is directed in a second direction (e.g., toward the "failed or rejected component or part path" or second outlet chute 90). It should be understood that the flowchart in FIG. 6 is for illustrative purposes only and that the method 100 should not be construed as limited to the flowchart in FIG. 6. Some of the steps of the method 100 may be rearranged while others may be omitted entirely.

The system described herein is an improvement relative to estimating the diameters of primer pockets of shell casings via straight-on images of the primer pockets where a frame of reference of the images of the primer pockets are viewed from the bottom of the shell casings and along the longitudinal axes of the shell casings. The primer pocket may include chamfers or fillets along longitudinal ends of the primer pockets. Such chamfers or fillets may cause variation in the measurements of the diameters of the primer pockets resulting in inaccurate measurements. The system described herein limits the view of the laser lines as projected onto the interior surfaces 40 to predetermined windows 128, 148 for estimating the diameters of the primer pockets 14. Such predetermined windows 128, 148 are positioned toward the middle of the interior surfaces 40 and away from the longitudinal axes of the primer pockets 14 such that the chamfers or fillets are excluded from the image data that is utilized to estimate the diameters of the primer pockets 14, increasing the accuracy of the estimation of the diameters of the primer pockets 14.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An inspection system for casings comprising:

first and second lasers (i) disposed on first and second opposing sides of the casings, respectively, (ii) oriented at first and second angles relative to longitudinal axes of the casings, respectively, and (iii) configured to project first and second laser lines onto a lateral interior surface and not onto a bottom interior surface of each casing, wherein the lateral interior surface and bottom interior surface of each casing are positioned within a pocket that is defined by each casing, the lateral interior surface of each casing extends inward from an exterior surface to the bottom interior surface within the pocket of each casing, and the first and second laser lines are projected onto the lateral interior surface of each casing along an angle relative to the longitudinal axes of the casings such that a depth at which the first and second laser lines extend into the pocket of each casing along the lateral interior surface of each casing increases from outer ends of the first and second laser lines to apexes of the first and second laser lines;

first and second cameras (i) disposed on the first and second opposing sides of the casings, respectively, (ii) oriented at third and fourth angles relative to the longitudinal axes of the casings, respectively, and (iii) configured to capture a set of images of the first and second laser lines on the lateral interior surface of each casing; and a controller programmed to estimate a dimension of each pocket based on a corresponding set of images of the first and second laser lines on a corresponding lateral interior surface of each casing.

2. The inspection system of claim 1, wherein (i) the first angle ranges between 60° and 70° and (ii) the second angle ranges between 60° and 70°.

3. The inspection system of claim 1, wherein (i) the third angle ranges between 20° and 30° and (ii) the fourth angle ranges between 20° and 30°.

4. The inspection system of claim 1, wherein (i) the third angle ranges between 30° and 40° and (ii) the fourth angle ranges between 30° and 40°.

5. The inspection system of claim 1 further comprising third and fourth cameras (i) disposed on the first and second opposing sides of the casings, respectively, (ii) oriented at fifth and sixth angles relative to the longitudinal axes of the casings, respectively, and (iii) configured to capture a second set of images of the first and second laser lines on the lateral interior surface of each casing.

6. The inspection system of claim 5, wherein the controller is further programmed to estimate the dimension of each pocket based on (i) the corresponding set of images of the first and second laser lines on the corresponding lateral interior surface of each casing and (ii) a corresponding second set of images of the first and second laser lines on the corresponding lateral interior surface of each casing.

7. The inspection system of claim 6, wherein the controller is further programmed to estimate the dimension of each pocket based on applying a line fitting algorithm to the corresponding first set of images and the corresponding second set of images to generate corresponding first and second diameter estimates, respectively.

8. The inspection system of claim 7, wherein the estimated dimension of each pocket is a diameter based on an average of the corresponding first and second diameter estimates.

9. The inspection system of claim 8 further comprising a conveyance system configured to transport the casings, wherein the controller is further programmed to, in response to the diameters of the pockets being within a tolerable range, direct the casings in a first direction along the conveyance system, and in response to the diameters of the pockets being outside of the tolerable range, direct the casings in a second direction along the conveyance system.

10. The inspection system of claim 7, wherein the line fitting algorithm is applied to portions of the corresponding first set of images and the corresponding second set of images that include portions of the first and second laser lines as projected onto the lateral interior surface of each casing.

11. The inspection system of claim 10, wherein the portions of the first and second laser lines include the apexes of the first and second laser lines.

12. The inspection system of claim 11, wherein the portions of the first and second laser lines do not include the outer ends of the first and second laser lines.

13. The inspection system of claim 11, wherein the line fitting algorithm is a curve fitting algorithm.

14. The inspection system of claim 11, wherein the line fitting algorithm is a regression analysis.

15. An inspection system for casings comprising:

first and second lasers configured to project first and second laser lines into a pocket defined by each casing and onto a lateral interior surface but not a bottom interior surface of each casing within the corresponding pocket, wherein the first and second laser lines are projected onto the lateral interior surface of each casing along an angle relative to a corresponding longitudinal axis such that a depth at which the first and second laser lines extend into the pocket of each casing along the lateral interior surface of each casing increases from outer ends of the first and second laser lines to apexes of the first and second laser lines;

first and second cameras configured to capture a set of images of the first and second laser lines on the lateral interior surface of each casing; and a controller programmed to estimate a dimension of the lateral interior surface of each casing based on a corresponding set of images of the first and second laser lines on a corresponding lateral interior surface of each casing.

16. The inspection system of claim 15, wherein the controller is further programmed to estimate the dimension of each lateral interior surface based on applying a line fitting algorithm to the corresponding set of images to generate at least one corresponding diameter estimate.

17. The inspection system of claim 16, wherein the line fitting algorithm is applied to portions of the corresponding set of images that include portions of the first and second laser lines as projected onto the lateral interior surface of each casing.

18. The inspection system of claim 17, wherein the portions of the first and second laser lines include the apexes of the first and second laser lines.

19. The inspection system of claim 18, wherein the portions of the first and second laser lines do not include the outer ends of the first and second laser lines.

20. The inspection system of claim 18, wherein the line fitting algorithm is a regression analysis.

* * * * *